United States Patent
Garimella et al.

(10) Patent No.: US 7,941,404 B2
(45) Date of Patent: May 10, 2011

(54) COORDINATED FEDERATED BACKUP OF A DISTRIBUTED APPLICATION ENVIRONMENT

(75) Inventors: Neeta Garimella, San Jose, CA (US); James P. Smith, Redwood City, CA (US); Chris Zaremba, Endicott, NY (US); Avishai Hochberg, San Jose, CA (US); Neil G. Rasmussen, Livermore, CA (US); Kala Dutta, San Jose, CA (US); Choonsu P. Park, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 11/371,986

(22) Filed: Mar. 8, 2006

(65) Prior Publication Data

US 2007/0214196 A1 Sep. 13, 2007

(51) Int. Cl.
*G06F 7/00* (2006.01)
*G06F 17/00* (2006.01)

(52) U.S. Cl. ........................ 707/649; 707/652
(58) Field of Classification Search .................. 707/202, 707/204, 999.204, 649, 652
See application file for complete search history.

(56) References Cited

U.S. PATENT DOCUMENTS

| | | | |
|---|---|---|---|
| 5,440,726 A * | 8/1995 | Fuchs et al. ..................... 714/20 |
| 6,266,679 B1 * | 7/2001 | Szalwinski et al. ........... 707/204 |
| 6,424,999 B1 | 7/2002 | Amon et al. |
| 6,665,812 B1 * | 12/2003 | Blumenau et al. ................ 714/5 |
| 6,857,053 B2 * | 2/2005 | Bolik et al. ..................... 711/162 |
| 6,934,727 B2 * | 8/2005 | Berkowitz et al. ............ 715/201 |
| 7,120,769 B2 * | 10/2006 | Yagawa et al. ................ 711/162 |
| 7,185,236 B1 * | 2/2007 | Moser et al. ..................... 714/47 |
| 7,231,461 B2 * | 6/2007 | Laschkewitsch et al. ..... 709/248 |
| 7,290,017 B1 * | 10/2007 | Wang et al. ..................... 707/204 |
| 7,363,332 B2 * | 4/2008 | Berkowitz et al. ............ 707/204 |
| 7,461,100 B2 * | 12/2008 | Spear et al. ..................... 707/204 |
| 7,765,187 B2 * | 7/2010 | Bergant et al. ................ 707/614 |
| 2003/0204690 A1 | 10/2003 | Yamada et al. |
| 2003/0217077 A1 * | 11/2003 | Schwartz et al. ............. 707/200 |
| 2003/0236956 A1 * | 12/2003 | Grubbs et al. ................ 711/162 |
| 2004/0034672 A1 | 2/2004 | Inagaki |
| 2004/0093361 A1 * | 5/2004 | Therrien et al. .............. 707/204 |
| 2004/0139125 A1 * | 7/2004 | Strassburg et al. ........... 707/202 |
| 2004/0153698 A1 | 8/2004 | Guzman et al. |
| 2004/0205377 A1 * | 10/2004 | Nakamura et al. ................ 714/4 |
| 2004/0260736 A1 * | 12/2004 | Kern et al. ..................... 707/204 |
| 2005/0021869 A1 | 1/2005 | Aultman et al. |
| 2005/0028026 A1 * | 2/2005 | Shirley et al. ..................... 714/6 |
| 2005/0044336 A1 | 2/2005 | Shimada et al. |
| 2005/0071588 A1 | 3/2005 | Spear et al. |
| 2005/0165867 A1 * | 7/2005 | Barton et al. ................. 707/204 |
| 2005/0172093 A1 | 8/2005 | Jain |
| 2006/0010227 A1 * | 1/2006 | Atluri ........................... 709/217 |
| 2006/0041727 A1 * | 2/2006 | Adkins et al. ................. 711/162 |
| 2007/0220320 A1 * | 9/2007 | Sen et al. ........................ 714/13 |

\* cited by examiner

*Primary Examiner* — Charles Kim
*Assistant Examiner* — Jeremy D Engelskirchen
(74) *Attorney, Agent, or Firm* — Canady & Lortz LLP; Bradley K. Lortz (57) ABSTRACT

Systems and methods are disclosed for providing a federated backup involving the coordination and synchronization of backup and restore operations among a plurality of hosts to ensure data consistency. A master node (backup host) acts as the initiator, coordinator, controller, and possibly as primary console for the entire backup and restore operation. All other worker application hosts and/or worker backup hosts operate as worker nodes and perform various backup and restore steps as directed by the master node. Centralized error handling aborts or recovers the entire backup operation in the event of failure on any one node. In addition, a logical view of the data is provided such that the backup can be managed as one entity, while backing up the data of each node. The backup workload may also be distributed to any other dedicated worker backup hosts (nodes) in order to minimize the impact to the production environment.

14 Claims, 5 Drawing Sheets

COORDINATED FEDERATED BACKUP OF A DISTRIBUTED APPLICATION ENVIRONMENT

BACKGROUND OF THE INVENTION

1. Field of the Invention

This invention relates to systems and methods for computer storage. Particularly, this invention relates to systems and methods for managing data backup in a distributed application environment.

2. Description of the Related Art

The requirements for computer software applications (such as large databases) have demanded ever improving response time, scalability, and rapid data growth over the years. In order to accommodate these requirements, the application deployment model has evolved from running an application on a single host using direct attached storage to a distributed environment where the application workload is distributed over multiple hosts using a centralized storage model. In such newer application environments each node typically operates autonomously with a higher logical entity performing some level of application coordination. An example of such an application is found in the IBM DB2 Enterprise Server Edition (ESE). In this application each node in the DB2 ESE essentially operates as an individual database and unaware of the existence of the other nodes. A catalog node then acts as the coordinating entity in this distributed environment.

The DB2 Universal Database (UDB) Enterprise Server Edition (ESE) is designed to meet the relational database server needs of mid- to large-size businesses. The application can be deployed on Linux, UNIX, or Windows servers of any size, from one CPU to hundreds of CPUs. DB2 ESE can operate as a foundation for building on demand enterprise-wide solutions, such as large data warehouses of multiple terabyte size or high performing 24×7 available high volume transaction processing business solutions, or Web-based solutions. The application can operate as the database back-end for ISVs building enterprise solutions, such as, Business Intelligence, Content Management, e-Commerce, ERP, CRM, or SCM. Additionally, DB2 ESE can provide connectivity, compatibility, and integration with other enterprise DB2 and Informix data sources.

Operating with a distributed application node computing environment, existing data protection solutions back up data of each application node operating as an independent backup application. Thus, the federation of backup data is limited to one node only. Fundamentally, it cannot be used in a distributed application environment for federated backup because there is no higher level of knowledge of the distributed data. The off-loaded data movement capability may exists but it is not flexible; entire data movement can be delegated to only a single system. A range of backup systems and methods have been developed without fully addressing this issue.

U.S. Patent Application 20050021869 by Aultman et al., published Jan. 27, 2005, discloses a data backup and recovery system that includes a backup and recovery (EBR) management network system. The EBR management network system includes an infrastructure for performing information storage, backup, and recovery operations for a business enterprise that is fully scalable and sharable. The EBR management network system includes the following modular backup and recovery models: (1) LAN network based backup and recovery models for applications requiring <200 GB; (2) LAN network based GigE backup and recovery model for applications requiring >500 GB and <1.5 TB; LAN-Free dedicated tape drive backup and recovery models; (3) LAN-Free shared tape drive backup and recovery models; (4) Server-Free backup and recovery models; and (5) application storage manager (ASM) backup and recovery models.

U.S. Patent Application 20040153698 by Guzman et al., published Aug. 5, 2004, discloses a system and method of disaster preparedness and restoration of service of damaged or destroyed telecommunication network elements. A computer-implemented method of disaster backup for network elements includes establishing connectivity to a plurality of network elements. A host computer may transmit one or more commands to the network elements for invoking a computer routine to create a plurality of computer readable service continuity data to a local memory of the network elements. An automated system of computer executable components for disaster recovery of network elements includes a computer executable controller component that is configured to select a plurality of network elements designated for disaster backup action. A computer executable engine component is configured to establish connectivity to the plurality of network elements and to transmit one or more commands to the network elements so as to replicate service continuity data for each of said network elements.

U.S. Pat. No. 6,424,999 by Arnon et al., issued Jul. 23, 2002, discloses a system comprising a mass storage subsystem, as a master device and backup subsystem, as a slave device, the slave device transferring data items to the master device during a restore operation. Each data item to be restored is identified by a data item identifier. The master device initially provides the slave device with a list of data item identifiers and the slave device receives the data item identifier list from the master device and order the data item identifiers thereon in an optimal order for transfer to the master device, the ordering based on the ordering of the data items on storage media on which they are stored. The master device, in each of a plurality of iterations, receives from the slave device data item identifiers identifying a data item transferred during a previous iteration and a data item to be transferred during the current iteration and requests the slave device to transfer the data item to be transferred. The master device uses the data item identifier that it receives from the slave device identifying the data item transferred during the previous iteration to confirm that the data item corresponded to the data item that was to have been transferred during the previous iteration. The slave device, in each iteration, provides the master device with the data item identifiers identifying the data item transferred during the previous iteration and the data item to be transferred during the current iteration, and transfers the data item to be transferred during the iteration to the master device when requested by the master device.

U.S. Patent Application 20050172093 by Manmohan, published Aug. 4, 2005, discloses a system for backing up and restoring information, includes at least one computer system including information to be backed up and restored, a storage device for receiving at least part of the information to be backed up and for storing and backing up the information. A controller includes a scheduling system for allowing a user to input into a job queue, a master job indicating one or more portions of the information of the at least one computer system to be backed up or restored, and a job control system that splits the master job into a plurality of smaller jobs and inputs the plurality of smaller jobs into the job queue.

U.S. Patent Application 20050071588 by Spear et al., published Mar. 31, 2005, discloses a method, system, and program for forming a consistency group of data. Information is provided on a consistency group relationship indicating a plurality of slave controllers and, for each indicated slave controller, a slave storage unit managed by the slave controller. A command is transmitted to each slave controller in the consistency group relationship to cause each slave controller to transmit data in the slave storage unit to a remote storage in a manner that forms the consistency group. A determination is made as to whether all the slave controllers successfully transmitted the data in the slave storage units that is part of the consistency group to the remote storage.

However, there is still a need in the art for systems and methods to provide an optimal backup solution for a distributed storage application operating across a plurality of interconnected hosts. There is a need in the art for backup systems and methods that facilitate a backup application distributed across more than one host computer. There is further a need in the art for such systems and methods to off-load backup operations to one or more hosts. In addition, there is a need in the art for such systems and methods to provide for both distributed application data and off-loaded backup operations to one or more hosts. As detailed hereafter, these and other needs are met by embodiments of the present invention.

SUMMARY OF THE INVENTION

Embodiments of the invention provide a federated backup system and method for the coordination and synchronization of backup and restore operations among a plurality of nodes (one or more worker application hosts and/or one or more worker backup hosts) to ensure data consistency. Centralized error handling aborts or recovers the entire backup operation in the event of failure on any one node. In addition, a logical view of the data is provided such that the backup can be managed as one entity, while backing up the data of each node. Embodiments of the invention may distribute the backup workload to other dedicated worker backup hosts (one type of worker node) in order to minimize the impact to the production environment.

A typical embodiment of the invention comprises a computer program embodied on a computer readable medium including program instructions for initiating a backup operation by opening a communication channel from a master node comprising a backup host to each of a plurality of worker nodes, program instructions for gathering information on the backup host about a data layout of data objects distributed on one or more of the plurality of worker nodes through the communication channel from the one or more of the plurality of worker nodes, and program instructions for distributing a backup creation workload for creating a point-in-time backup of the data objects to the plurality of worker nodes with the backup host. The data layout may comprise a logical-to-physical map of the data objects on the plurality of application hosts. In one exemplary embodiment, the plurality of application hosts together host a plurality of database partitions and the data objects comprise database data. Distributing the backup creation workload may be based on a type of the point-in-time backup of the data objects to be created as well as capabilities of the plurality of worker nodes.

In one example, the principle of worker nodes is readily applied to application hosts. Thus, the plurality of worker nodes may comprise one or more worker application hosts hosting a software application utilizing the data objects. Embodiments of the invention may include program instructions for directing the one or more worker application hosts to prepare for creating the point-in-time backup of the data objects with the backup host before distributing the workload of creating the backup, and program instructions for coordinating resumption of normal production by the one or more worker application hosts with the backup host after distributing the workload of creating the point-in-time backup. Further embodiments may include program instructions for determining and distributing a backup validation workload to the one or more worker application hosts for validating the point-in-time backup with the backup host. In addition, the backup host may synchronize work of the one or more worker application hosts by waiting until receiving completion status for a current distributed operation from each of the one or more worker application hosts before initiating a next distributed operation with the one or more worker application hosts. Additionally, the backup host may abort a current distributed operation in response to any failures of the one or more worker application hosts being reported to the backup host. The backup host may further initiate and coordinate an error recovery of the current distributed operation in response to any failures of the one or more worker application hosts being reported to the backup host.

In another example, the principle of worker nodes may be applied to other backup hosts in addition to the master node. Thus, the plurality of worker nodes may comprise one or more worker backup hosts directed by the backup host (master node) to facilitate creating the point-in-time backup of the data objects. Embodiments of the invention may include program instructions for creating a group structure of the point-in-time backup with the backup host and distributing a data transfer workload to the one or more worker backup hosts of the plurality of worker nodes to transfer the point-in-time backup to a storage server.

Similar to the program embodiment, a typical method embodiment of the invention may comprise initiating a backup operation by opening a communication channel from a master node comprising a backup host to each of a plurality of worker nodes, gathering information on the backup host about a data layout of data objects through the communication channel from one or more of the plurality of worker nodes, and distributing a backup creation workload for creating a point-in-time backup of the data objects to the plurality of worker nodes with the backup host. The method embodiment of the invention may be further modified consistent with the program and system embodiments described herein.

BRIEF DESCRIPTION OF THE DRAWINGS

Referring now to the drawings in which like reference numbers represent corresponding parts throughout.

DETAILED DESCRIPTION OF THE PREFERRED EMBODIMENT

1. Coordinated Federated Backup of a Distributed Application Environment

Embodiments of the invention introduce the operation of a master node and worker nodes among interconnected hosts running the distributed backup application. The master node acts as the initiator, coordinator, controller, and possibly as primary console for the entire backup and restore operation. All other worker application hosts and worker backup hosts function as the worker nodes and perform various backup and restore steps as directed by the master node.

The master node federates the backup application by creating a group structure on the backup server that captures application data-layout information. All other hosts simply back up their respective data into the group as instructed by the master node. The backup objects may be files, image, API objects or any other objects supported by a storage management server, e.g. IBM Tivoli Storage Manager. In addition, the master node typically gathers information regarding the application configuration and the layout of the data on all application worker nodes. Accordingly, the master node is able to make intelligent decisions about distributing workload among all the worker nodes. If a failure occurs on a worker node, it is reported back to the master node. Based on the type of error and the context within the operation, master node can either initiate and coordinate recovery of the operation or abort the operation across all participating nodes.

Figure 1A:
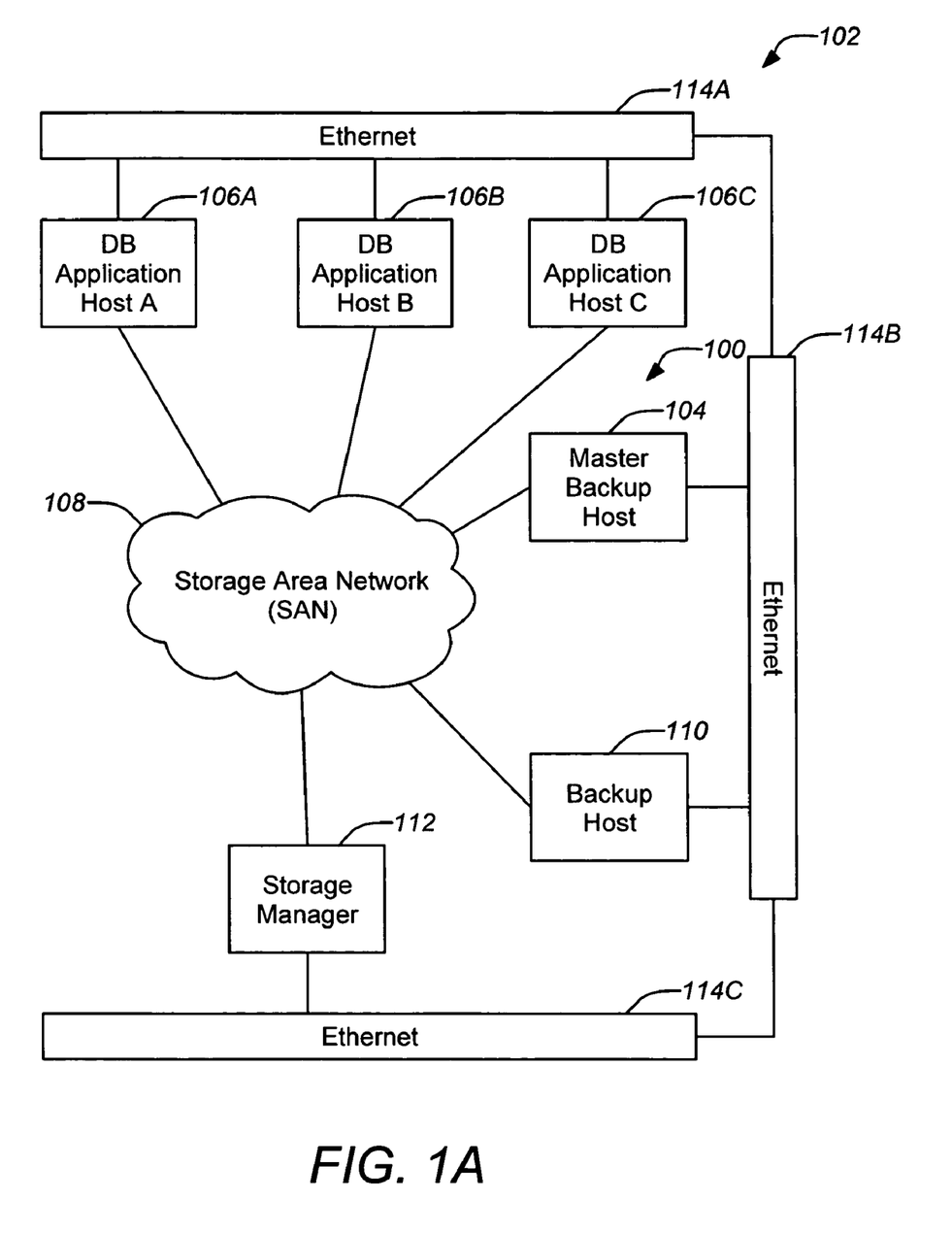
FIG. 1A is a functional block diagram of an exemplary backup system embodiment of the invention.

FIG. 1A is a functional block diagram of an exemplary backup system 100 embodiment of the invention. The backup system 100 operates on a network 102 of computer devices. A plurality of worker application hosts 106A-106C are interconnected to the network 102 and operating as a distributed computer system running one or more software applications. For example, the plurality of worker application hosts 106A-106C may be production hosts for a database application (e.g. IBM DB2) hosting various database partitions in a distributed manner. The worker application hosts 106A-106C may utilize storage on a storage area network (SAN) 108 that is overseen by a storage manager 112, e.g. an Enterprise SAN controlled through an IBM Tiroli Storage Manager. Typically, all the devices on the network 102 are interconnected through Ethernet links 114A-114C (including the SAN 108) to enable all the production, backup and storage operations.

Embodiments of the invention are enabled through a backup host 104 which functions as a master node over all the other worker nodes (application worker hosts and possibly backup worker hosts) in the backup system 100. The plurality of worker application hosts 106A-106C function as a plurality of application worker nodes under the coordinated direction of the master node to perform a backup of data objects on the application hosts 106A-106C. Additionally, all of the operations of the backup host 104 master node may be supported by one or more additional worker backup hosts 110 operating as backup worker nodes. As such, reference to a backup host 104 throughout the application may indicate either a single host or a host supported by one or more backup worker nodes.

Figure 1B:
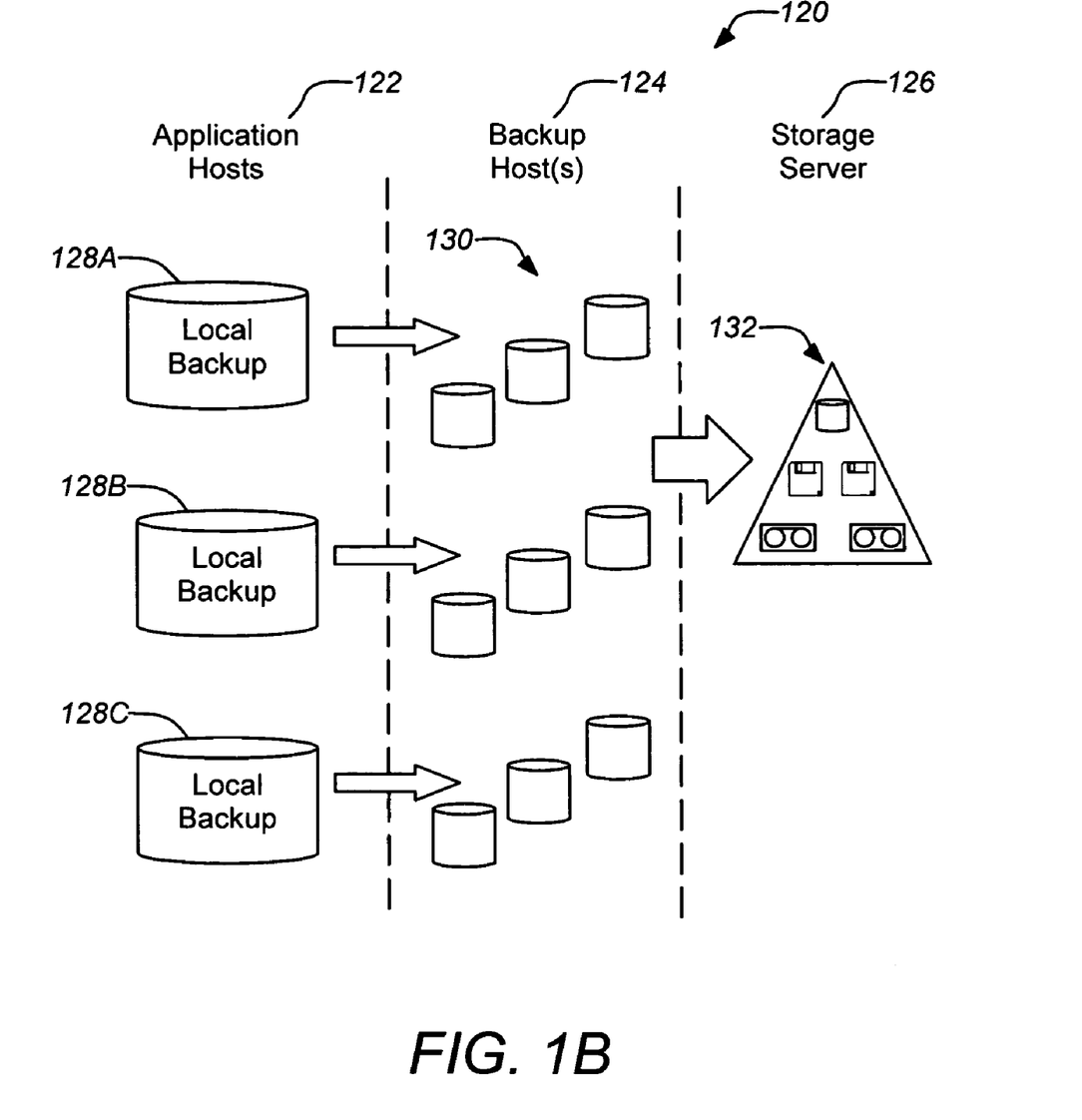
FIG. 1B illustrates the backup transfer from the data layout of application hosts into the group structure on a backup host and on to a storage server for an exemplary embodiment of the invention.

FIG. 1B illustrates the backup transfer from the data layout of application hosts 122 into the group structure on a backup host 124 and on to a storage server 126 for an exemplary embodiment of the invention. Essentially, the application hosts 122 (e.g. worker application hosts 106A-106C of FIG. 1A) operating as application worker nodes, under direction from the backup host 124 (e.g. master backup host 104 of FIG. 1A), operating as the master node, participate in creating a point-in-time (snapshot) backup of their respective local data 128A-128C to the group structure 130 on the backup host 124 (which may optionally include one or more supporting backup worker nodes, e.g. worker backup host 110 of FIG. 1A). The point-in-time backups of the local backups 128A-128C in the group structure 130 may then be validated by the backup host(s) 124 (again, optionally supported by one or more additional backup worker nodes). Finally, the validated group structure 130 backup is then transferred to a storage server 126, e.g. through a storage manager 112 such as an IBM Tivoli Storage Manager operating over a SAN 108. The storage server 126 may implement a policy-based hierarchical storage system 132 to coordinate backup storage. Some of the distinctions and advantages of the federated backup embodiments of the present invention are as follows.

The master node is the single point of control and the application worker nodes are unaware of each other. This allows the backup application deployment architecture to be reflected back in the backup group structure paradigm. In addition, during each operation of the federated backup process, the master node waits until it has received a completion status from all the nodes performing a unit of work, before initiating the next unit. This enables the synchronization required for the coordination of a larger piece of work, such as a backup and restore process, with easier manageability and error handling in such a complex environment. Also, since the master node is aware of the entire application deployment architecture it is able to make intelligent decisions concerning the workload distribution based on the type of workload and other relevant criteria. Some examples of processes that can be facilitated through a distributed workload are snapshot creation, validation of a snapshot image and backup data movement. Some of the criteria for distribution of the workload are application type, operating system, snapshot provider, physical layout of the data with respect to logical layout, number of available systems for off-load, size of the data, smallest unit of work that can be distributed. Furthermore, as will be understood by those skilled in the art, embodiments of the invention can be applied to any application which has distributed application hosts or an off-loaded backup such as DB2 Enterprise Server Edition, Oracle, Exchange, SQL Server, or mySAP.

The plurality of worker nodes controlled by the master node may be either worker application hosts and/or worker backup hosts. One or more worker application hosts may support a software application, such as a database application as previously described. A typical embodiment of the invention may include a plurality of worker application hosts. However, embodiments of the invention also encompass an application that is not distributed across a plurality of worker application hosts (i.e. a single worker application host) but where a backup requires workload distribution, coordination, and synchronization, e.g. because the amount data is too large to be handled by one worker node (backup worker node) efficiently such as with some large file systems, e.g. GPFS, SANFS. In this case, the plurality of worker nodes will include one or more worker backup hosts to support the backup of a single worker application host. In any case, those skilled in the art will recognize that embodiments of the invention encompass use of a plurality of worker nodes which may incorporate one or more worker application hosts and/or one or more worker backup hosts depending upon the particular application.

2. Hardware Environment

Figure 2A:
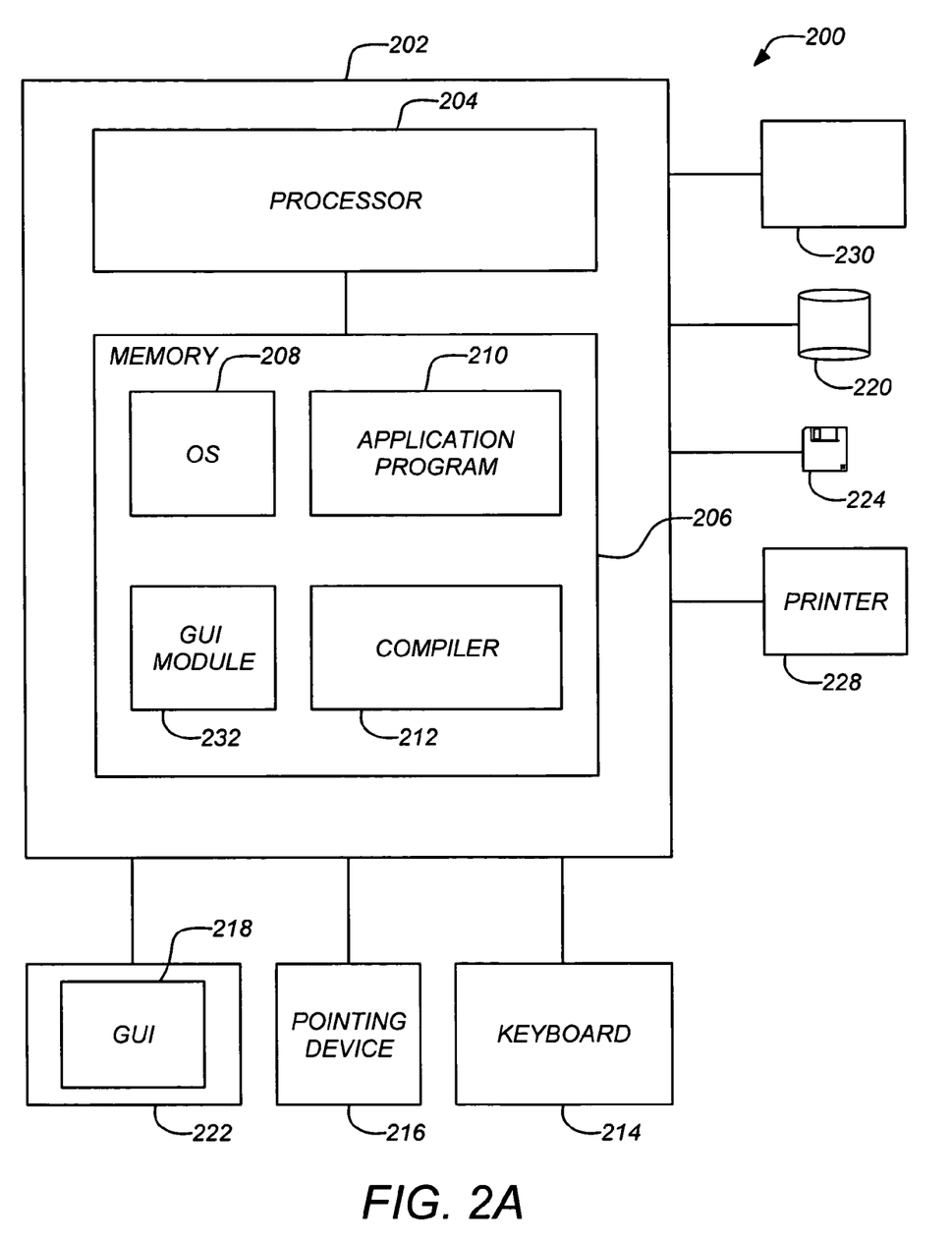
FIG. 2A illustrates an exemplary computer system that can be used to implement embodiments of the present invention.

FIG. 2A illustrates an exemplary computer system 200 that can be used to implement embodiments of the present invention. The computer 202 comprises a processor 204 and a memory 206, such as random access memory (RAM). The computer 202 is operatively coupled to a display 222, which presents images such as windows to the user on a graphical user interface 218. The computer 202 may be coupled to other devices, such as a keyboard 214, a mouse device 216, a printer, etc. Of course, those skilled in the art will recognize that any combination of the above components, or any number of different components, peripherals, and other devices, may be used with the computer 202.

Generally, the computer 202 operates under control of an operating system 208 (e.g. z/OS, OS/2, LINUX, UNIX, WINDOWS, MAC OS) stored in the memory 206, and interfaces with the user to accept inputs and commands and to present results, for example through a graphical user interface (GUI) module 232. Although the GUI module 232 is depicted as a separate module, the instructions performing the GUI functions can be resident or distributed in the operating system 208, a computer program 210, or implemented with special purpose memory and processors.

The computer 202 also implements a compiler 212 which allows one or more application programs 210 written in a programming language such as COBOL, PL/1, C, C++, JAVA, ADA, BASIC, VISUAL BASIC or any other programming language to be translated into code that is readable by the processor 204. After completion, the computer program 210 accesses and manipulates data stored in the memory 206 of the computer 202 using the relationships and logic that was generated using the compiler 212. The computer 202 also optionally comprises an external data communication device 230 such as a modem, satellite link, ethernet card, wireless link or other device for communicating with other computers, e.g. via the Internet or other network.

In one embodiment, instructions implementing the operating system 208, the computer program 210, and the compiler 212 are tangibly embodied in a computer-readable medium, e.g., data storage device 220, which may include one or more fixed or removable data storage devices, such as a zip drive, floppy disc 224, hard drive, DVD/CD-rom, digital tape, etc., which are generically represented as the floppy disc 224. Further, the operating system 208 and the computer program 210 comprise instructions which, when read and executed by the computer 202, cause the computer 202 to perform the steps necessary to implement and/or use the present invention. Computer program 210 and/or operating system 208 instructions may also be tangibly embodied in the memory 206 and/or transmitted through or accessed by the data communication device 230. As such, the terms "article of manufacture," "program storage device" and "computer program product" as may be used herein are intended to encompass a computer program accessible and/or operable from any computer readable device or media.

Embodiments of the present invention are generally directed to any software application program 210 that manages making backups of data over a network. Particularly, embodiments of the invention may employ snapshot backups which operate somewhat differently than simply making a full copy of specified data. Through special handling of the data, a known snapshot backup comprises a virtually perfect copy of the data at a specific point in time, a "picture" of the data taken at a specified instant, typically without regard to the amount of data being backed up. Effectively, a snapshot backup operates by only backing up the changes that have occurred. In addition, only the differences in the data are transferred across the backup connection, greatly reducing the overhead required to operate a snapshot backup compared to a traditional backup. Embodiments of the invention may employ a snapshot technology provider as any layer in the storage stack such as the file system, volume manager, or storage subsystem.

The program 210 may operate as part of a distributed computer system comprising a network of computing devices. Further, the network may encompass one or more computers connected via a local area network and/or Internet connection (which may be public or secure, e.g. through a VPN connection).

Figure 2B:
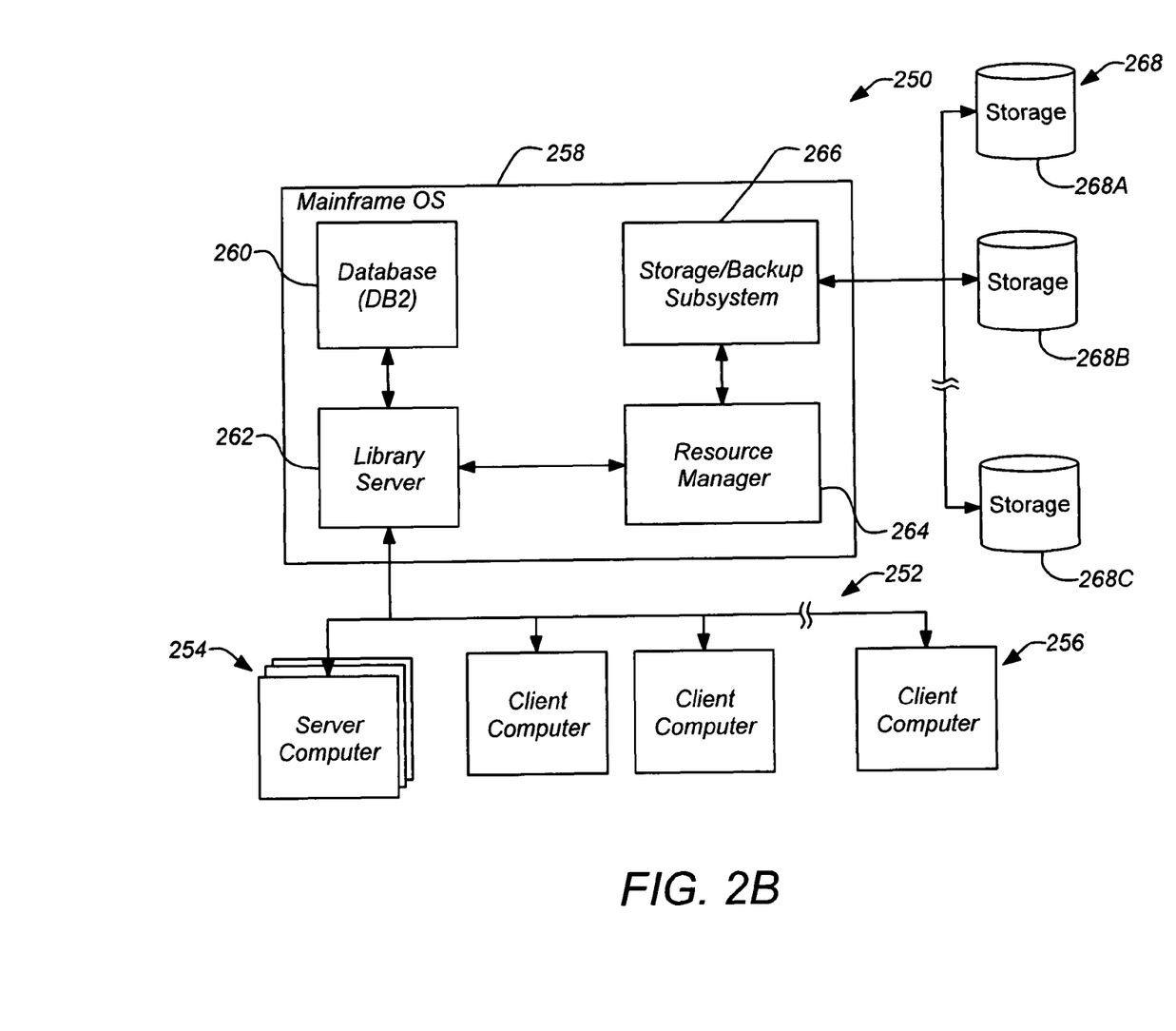
FIG. 2B illustrates a typical distributed computer system which may be employed in an typical embodiment of the invention.

FIG. 2B illustrates a typical distributed computer system 250 which may be employed in an typical embodiment of the invention. Such a system 250 comprises a plurality of computers 202 which are interconnected through respective communication devices 230 in a network 252. The network 252 may be entirely private (such as a local area network within a business facility) or part or all of the network 252 may exist publicly (such as through a virtual private network (VPN) operating on the Internet). Further, one or more of the computers 202 may be specially designed to function as a server or host 254 facilitating a variety of services provided to the remaining client computers 256. In one example one or more hosts may be a mainframe computer 258 where significant processing for the client computers 256 may be performed. The mainframe computer 258 may comprise a database 260 which is coupled to a library server 262 which implements a number of database procedures for other networked computers 202 (servers 254 and/or clients 256). The library server 262 is also coupled to a resource manager 264 which directs data accesses through storage/backup subsystem 266 that facilitates accesses to networked storage devices 268 comprising a SAN (such as shown in FIG. 1). The SAN includes devices such as direct access storage devices (DASD) optical storage and/or tape storage indicated as distinct physical storage devices 268A-268C. Various known access methods (e.g. VSAM, BSAM, QSAM) may function as part of the storage/backup subsystem 266.

As is well known in the art, logical unit numbers (LUNs) may be employed in a network of devices, e.g. through the small computer standard interface (SCSI), to access and manage networked computer devices, such as storage devices. Commonly, a LUN is a unique identifier used on a SCSI bus to distinguish between devices that share a common bus. It is necessary for the LUN to be unique among all the devices that are visible to each other. Devices that request I/O processes may be called sources. Targets are devices that perform operations requested by the sources. Each target can accommodate other devices that are each assigned an LUN.

Those skilled in the art will recognize many modifications may be made to this hardware environment without departing from the scope of the present invention. For example, those skilled in the art will recognize that any combination of the above components, or any number of different components, peripherals, and other devices, may be used with the present invention meeting the functional requirements to support and implement various embodiments of the invention described herein.

3. Coordinated Federated Backup Process

As previously described in FIG. 1, a master node acts as the initiator, coordinator, controller and possibly the primary console for the entire backup and restore operation. All other worker application hosts (and possibly additional worker backup hosts) act as the worker nodes and perform various backup and restore steps as directed by the master node. The master node federates the backup by creating a group structure on the backup server that captures the application's data layout information. All other hosts backup their data into the group as instructed by the master node. If failure occurs at the worker node, it is reported back to the master node. Based on the type of error and the context within the operation, the master node can either initiate and coordinate recovery or abort all operation across all participating nodes. Embodiments of the invention may be illustrated through an operational sequence which may be performed by the exemplary backup system of FIG. 1.

Figure 3:
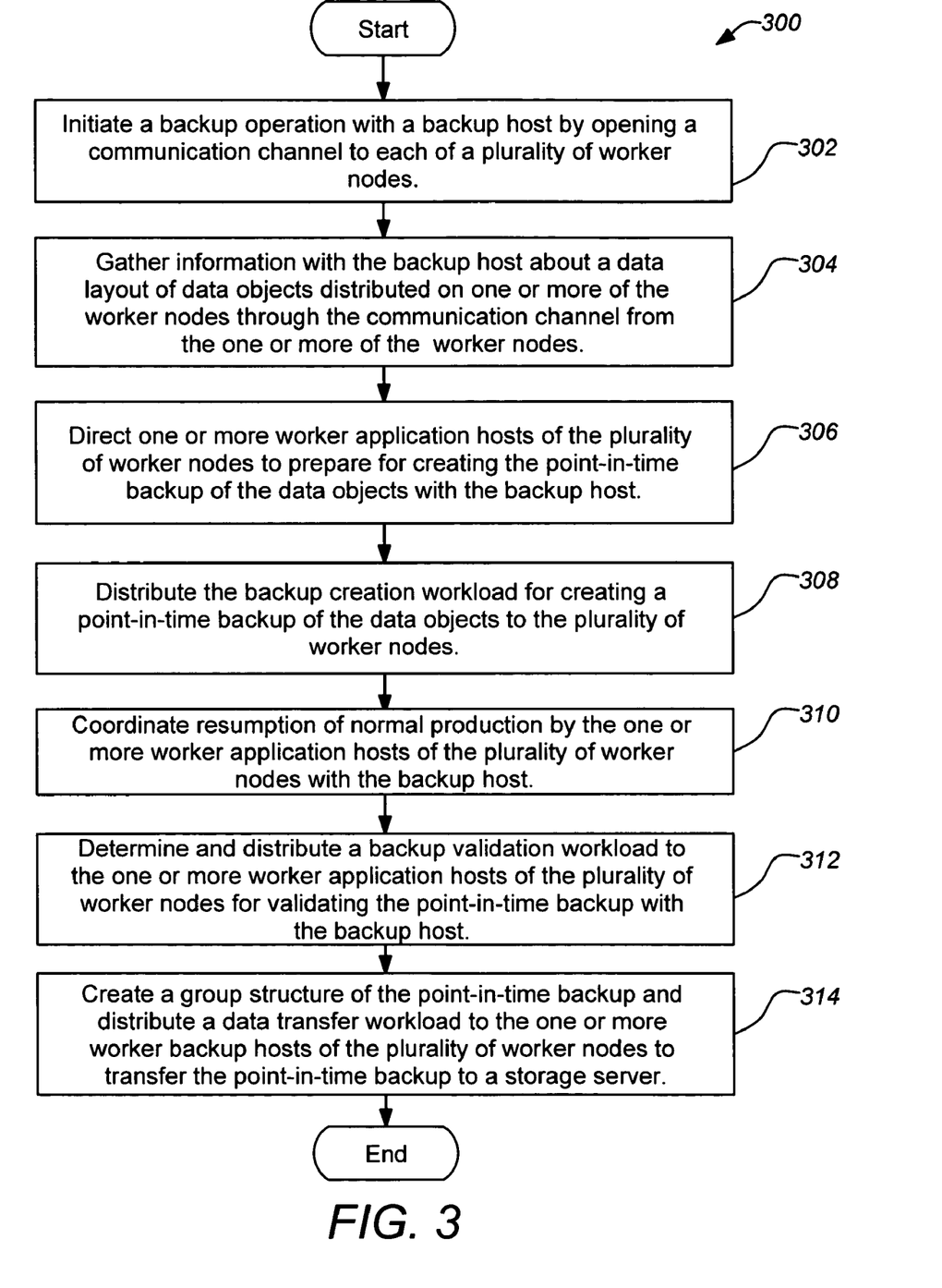
FIG. 3 is a flowchart of an exemplary method of the invention.

FIG. 3 is a flowchart of an exemplary method 300 of the invention describing a coordinated federated backup in this environment. In operation 302, a backup host initiates a backup operation by opening a communication channel to each of a plurality of worker nodes. Typically, the backup host comprises the master node and the plurality of application hosts are a plurality of application worker nodes interconnected to the master node. In operation 304, the backup host (master node) gathers information about a data layout of data objects distributed on the plurality of worker nodes through the communication channel from one or more of the plurality of worker nodes. The data layout may comprise a logical (e.g., database table space containers, files, logical volume) to physical map (LUNs used on the storage subsystem) on each application host. However, the data layout can vary depending on where the snapshot is created. For example, the foregoing layout description is valid for hardware based snapshots. Other layout forms known to those skilled in the art will apply for software based snapshots. The data objects of the layout may be files, images, API object or any other object supported by the applicable storage system (e.g. Tivoli Storage Manager). Thus, the backup host gathers information about the data layout of data objects distributed on the plurality of application hosts.

Next, in operation 306, the backup host (master node) directs the one or more worker application hosts of the plurality of worker nodes to prepare for creating the point-in-time backup of the data objects. This may entail quiescing the application, forcing all users off the database application, to create a consistent data set. For example, in the IBM DB2 Enterprise Server Edition a specific sequence is required in which write operations to all database partitions must be suspended. The requirements and/or necessity of directing the application hosts to prepare for the backup may vary depending upon the particular application as will be understood by those skilled in the art.

At this point, in operation 308, the backup host (as the master node) distributes the backup creation workload for creating a point-in-time backup, e.g. a point-in-time copy of the data such as a snapshot backup, of the data objects to the plurality of worker nodes (e.g. worker application hosts). Distributing the backup creation workload may also include invoking one or more additional worker backup hosts which operate as backup worker nodes to support function of the backup host master node. The point in time copies may be created in many ways, e.g. by each application host locally, by the master node alone or distributed among all the worker backup hosts. Distribution of the workload may be based on a variety of parameters such as the number of LUNs, the LUN configuration on the subsystem, availability of snapshot software on the hosts system, and other parameters as will be understood by those skilled in the art. In one example, hardware based snapshots are used and the snapshot creation task may be distributed among backup systems based on the storage subsystem/array configuration or simply divided among the backup systems based on the number of LUNs.

In operation 310, the backup host (master node) coordinates resumption of normal production by one or more worker application hosts of the plurality of worker nodes. For example, IBM DB2 Enterprise Server Edition requires a specific order for resuming database partitions. Similar to the backup preparation operation 306, the requirements and/or necessity of coordinating the resumption of normal production may vary depending upon the particular application as will be understood by those skilled in the art.

Next, in operation 312, the backup host (master node) may determine and distribute a backup validation workload to the one or more worker application hosts of the plurality of worker nodes for validating the point-in-time backup. Validation of the backup is highly desirable but not required. In addition, the backup validation workload may also be distributed to backup host worker nodes (if used) to support the validation process. An example of validating the point-in-time backup is to mount the file systems onto the LUNs which were the target of a FlashCopy. FlashCopy is a known function of the IBM Enterprise Storage Subsystem (ESS). FlashCopy may be invoked when the source volume and target volume are contained in the same ESS Logical Subsystem (LSS). When executed, "Fast Data Replication," allows both the source and target data to be used almost immediately. "Fast Data Replication" occurs in two phases, a logical completion, where a bitmap is constructed to describe the source volume, and a physical completion, which will depend on the purpose for the target volume. Other additional and alternate backup validation processes may also be performed as will be understood by those skilled in the art.

In operation 314, after validation, the backup host (master node) creates a group structure of the point-in-time backup and distributes a data transfer workload to the one or more worker backup hosts of the plurality of worker nodes to transfer the point-in-time backup to a storage server. Thus, once worker nodes have validated the consistency of the backup data, the master node creates the group structure on the backup server. It then distributes the data transfer workload for performing the data transfer between the available backup worker nodes. Here also, the data transfer workload is supported by one or more additional worker backup hosts (backup worker nodes) if they are employed to support the master node. The master node provides instructions to each worker node regarding which data to backup and where to place the data on the storage server, e.g. an IBM Tivoli Storage Manager. The backup host (master node) then waits for the data transfer to complete on all worker nodes before marking the backup complete.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. A computer program embodied on a non-transitory computer readable storage medium, comprising:

program instructions for initiating a backup operation by opening a communication channel from a master node comprising a backup host to each of a plurality of worker nodes;

program instructions for gathering information on the backup host about a data layout of data objects distributed on one or more of the plurality of worker nodes through the communication channel from the one or more of the plurality of worker nodes;

program instructions for distributing by the backup host a backup creation workload for creating a point-in-time backup of the data objects to the plurality of worker nodes, wherein the plurality of worker nodes comprises one or more worker application hosts hosting a software application utilizing the data objects, where the point-in-time backup of the one or more worker application hosts is supported by a plurality of worker backup hosts of the plurality of worker nodes because the amount of data is too large to be handled by one worker backup host, and program instructions for federating the backup operation by creating a group structure of the point-in-time backup with the backup host and distributing by the backup host a data transfer workload to the plurality of worker backup hosts to transfer the point-in-time backup to a storage server;

wherein the master node is the single point of control and the worker nodes are unaware of each other and wherein the plurality of worker nodes comprises the plurality of worker backup hosts directed by the backup host to facilitate creating the point-in-time backup of the data objects.

2. The computer program of claim 1, wherein distributing the backup creation workload is based on a type of the point-in-time backup of the data objects and capabilities of the plurality of worker nodes.

3. The computer program of claim 1, further comprising program instructions for directing the one or more worker application hosts to prepare for creating the point-in-time backup of the data objects with the backup host before distributing the workload of creating the backup: and program instructions for coordinating resumption of normal production by the one or more worker application hosts with the backup host after distributing the workload of creating the point-in-time backup.

4. The computer program of claim 1, further comprising program instructions for determining and distributing a backup validation workload to the one or more worker application hosts for validating the point-in-time backup with the backup host.

5. The computer program of claim 1, wherein the backup host synchronizes work of the one or more worker application hosts by waiting until receiving completion status for a current distributed operation from each of the one or more worker application hosts before initiating a next distributed operation with the one or more worker application hosts.

6. The computer program of claim 1, wherein the backup host aborts a current distributed operation in response to any failures of the one or more worker application hosts being reported to the backup host.

7. The computer program of claim 6, wherein the backup host further initiates and coordinates an error recovery of the current distributed operation in response to any failures of the one or more worker application hosts being reported to the backup host.

8. A method, comprising: initiating a backup operation with a processor by opening a communication channel from a master node comprising a backup host to each of a plurality of worker nodes;

gathering information on the backup host with the processor about a data layout of data objects distributed on one or more of the plurality of worker nodes through the communication channel from the one or more of the plurality of worker nodes:

distributing by the backup host with the processor a backup creation workload for creating a point-in-time backup of the data objects to the plurality of worker nodes, wherein the plurality of worker nodes comprises one or more worker application hosts hosting a software application utilizing the data objects, where the point-in-time backup of the one or more application hosts is supported by a plurality, of worker backup hosts of the plurality of worker nodes because the amount of data is too large to be handled by one worker backup host, and federating the backup operation by creating a group structure of the point-in-time backup with the backup host and distributing by the backup host a data transfer workload to the plurality of worker backup hosts to transfer the point-in-time backup to a storage server;

wherein the master node is the single point of control and the worker nodes are unaware of each other and wherein the plurality of worker nodes comprises the plurality of worker backup hosts directed by the backup host to facilitate creating the point-in-time backup of the data objects.

9. The method of claim 8, wherein distributing the backup creation workload is based on a type of the point-in-time backup of the data objects and capabilities of the plurality of worker nodes.

10. The method of claim 8, further comprising directing the one or more worker application hosts to prepare for creating the point-in-time backup of the data objects with the backup host before distributing the workload of creating the backup; and coordinating resumption of normal production by the one or more worker application hosts with the backup host after distributing the workload of creating the point-in-time backup.

11. The method of claim 8, further comprising determining and distributing a backup validation workload to the one or more worker application hosts for validating the point-in-time backup with the backup host.

12. The method of claim 8, wherein the backup host synchronizes work of the one or more worker application hosts by waiting until receiving completion status for a current distributed operation from each of the one or more worker application hosts before initiating a next distributed operation with the one or more worker application hosts.

13. The method of claim 8, wherein the backup host aborts a current distributed operation in response to any failures of the one or more worker application hosts being reported to the backup host.

14. The method of claim 13, wherein the backup host further initiates and coordinates an error recovery of the current distributed operation in response to any failures of the one or more worker application hosts being reported to the backup host.

\* \* \* \* \*